Dec. 16, 1969  S. P. JONES  3,484,220
CARBURETORS FOR INTERNAL COMBUSTION ENGINES
Filed Sept. 20, 1965  2 Sheets-Sheet 1

INVENTOR
Sam P. Jones

BY Shley & Shley

ATTORNEYS

INVENTOR
Sam P. Jones

United States Patent Office 3,484,220
Patented Dec. 16, 1969

3,484,220
CARBURETORS FOR INTERNAL COMBUSTION ENGINES
Sam P. Jones, Dallas, Tex., assignor to J & S Carburetor Company, Dallas, Tex., a corporation of Texas
Filed Sept. 20, 1965, Ser. No. 488,598
Int. Cl. B01f 3/02
U.S. Cl. 48—180                    9 Claims

ABSTRACT OF THE DISCLOSURE

A carburetor for internal combustion engines having a passage communicating with the atmosphere and with the engine intake manifold with a throttle valve and venturi being mounted therein adjacent said manifold; the venturi has a gaseous fluid inlet in its throat, its outlet directed toward and communicating with said manifold upon opening of the throttle valve and its inlet communicating with the atmosphere upon the opening of valve means in the passage. The valve means is constantly urged closed and its movement is controlled by pressure-responsive means having one of its surfaces exposed to the atmosphere and its opposite surface exposed to the intake manifold and to the passage between the throttle valve and valve means.

---

This invention relates to new and useful improvements in carburetors for internal combustion engines.

The novel carburetor is adapted to supply an explosive or combustible mixture of fuel gas and air to internal combustion engines and is particularly designed for utilizing liquefied petroleum gas which consists essentially of butane, propane and mixtures thereof and which is commonly known as LPG. It is difficult to start engines operating on the latter fuel since LPG and air mixtures have a much narrower and more critical explosive range than gasoline or other liquid fuel and air mixtures. Therefore, a more accurate control of the gaseous fuel/air ratio is required for proper starting as well as operation of engines on LPG. The gaseous fuel-air mixture is controlled automatically for operating engines under starting, idling, idle progression and full loading conditions and the control is effective irrespective of the rapidity or slowness and/or regularity of the changing of the engine operation from one condition to another. The carburetor is adapted to supply a combustible mixture of sufficient richness to ensure the substantially instant starting of engines and to reduce such richness for idling and other operating speeds by increasing the admission of air, means being provided for maintaining a gaseous fuel-air mixture of the proper richness for starting conditions in the intake manifolds of the engines so as to ensure virtually instant starting thereof.

Pressure-responsive means and means for creating pressure differentials thereacross, which vary in accordance with the engine loading and operating conditions, are provided for placing the pressure-responsive means wholly or partially in restricting relation to a venturi for regulating the rate of air and gaseous fuel flow through the carburetor as well as for withdrawing said pressure-responsive means for operation to permit sole venturi-control of the flow of air and gaseous fuel. The pressure-responsive means has valve means associated therewith for actuation thereby, the valve means being arranged to be opened by the opening movement of the throttle valves of engines in the event of flooding thereof to permit the purging and starting of the engines.

A construction designed to carry out the invention will be hereinafter described together with other features of the invention.

Figure 4:
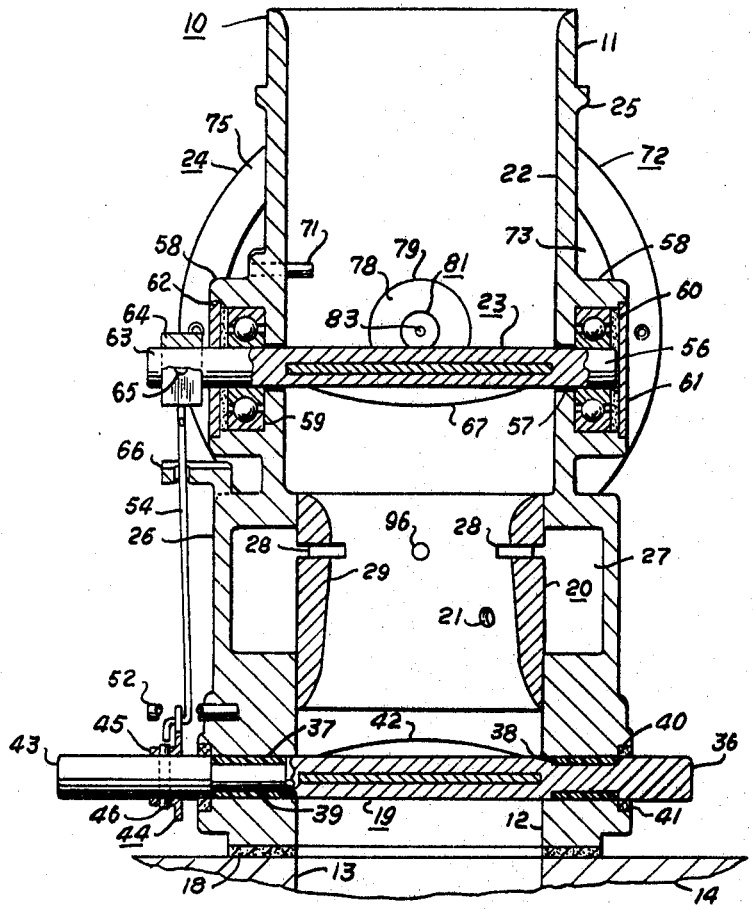
Figure 1:
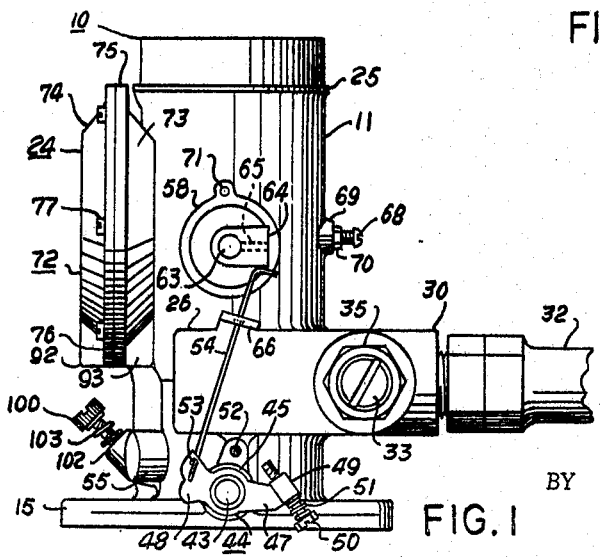
Figure 2:
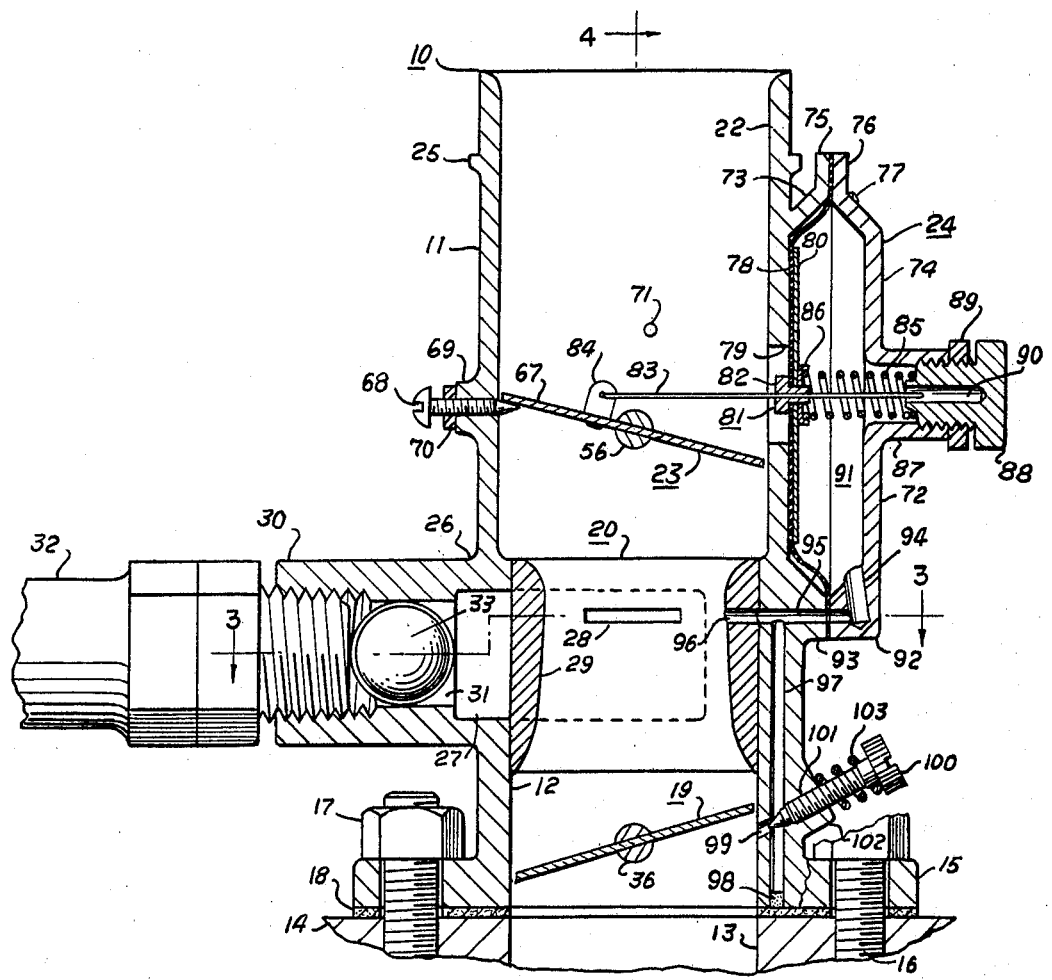
Figure 3:
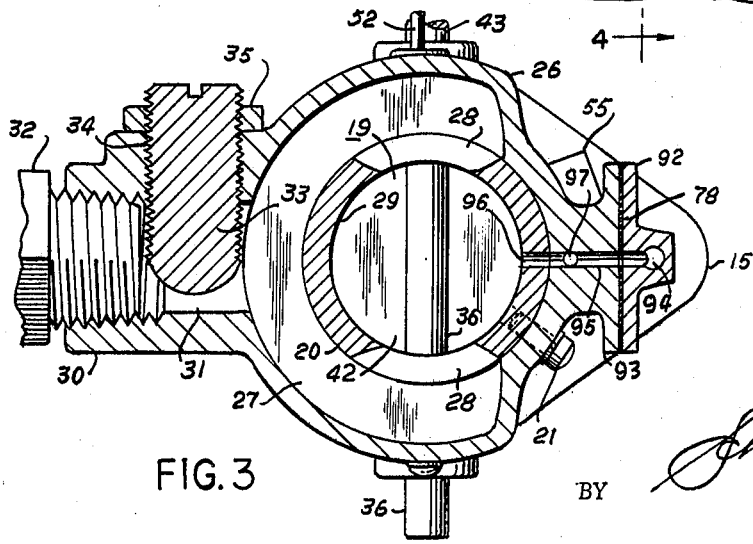

The invention will be more readily understood from a reading of the following specification and by reference to the accompanying drawings, wherein an example of the invention is shown, and wherein:

FIG. 1 is a side elevational view of a carburetor for an internal combustion engine constructed in accordance with the invention, FIG. 2 is an enlarged, longitudinal, sectional view of the carburetor mounted on the intake manifold of an internal combustion engine, FIG. 3 is a transverse, section view taken on the ilne 3—3 of FIG. 2, and FIG. 4 is a longitudinal, sectional view taken on the line 4—4 of FIG. 2.

In the drawings, the numeral 10 designates a carburetor embodying the principles of the invention and having a substantially cylindrical body or housing 11 formed with a coextensive bore 12 for communicating with the substantially complementary inlet opening 13 of the intake manifold 14 (only a portion of which is shown) of an internal combustion engine (FIGS. 2 and 4). External, diametrically-opposed flanges 15 project laterally from the base or inner end of the body 11 for attachment to the manifold 14 by stud bolts 16 and nuts 17 in the usual manner, preferably upright, with a sealing gasket 18 clamped between the base and manifold. A butterfly type throttle valve 19 is rotatably mounted in the base or lower portion of the bore 12 of the body below a substantially conventional tubular venturi or venturi tube 20 which is complementary to and removably fastened in said bore by a screw 21 (FIG. 3). Above the venturi 20, a coaxial counterbore 22 is provided by enlarging the diameter of the outer or upper portion of the bore and has its outer or upper end open to the atmosphere. An auxiliary or choke valve 23, of the butterfly type, is rotatably mounted in the inner or lower portion of the counterbore 22 immediately above the venturi and its movement is adapted to be controlled, at least in part, by a diaphragm or other pressure-responsive member 24 mounted on the exterior of the body 11 below its outer or upper end. If desired, the outer or upper end portion of the body may have an external, radial flange 25 for supporting a conventional air cleaner (not shown) thereon.

The body 11 has an enlarged, offset portion 26, which is semi-circular in cross-section, to provide a complementary chamber 27 in partially surrounding relation to the bore 12 immediately below the counterbore 22 as well as to the venturi 20. Diametrically-opposed slots or openings 28, which are elongated radially or transversely of the venturi, establish sole communication between the inner or upper portion of its throat 29 and the chamber 27 (FIGS. 2–4). The enlarged body portion 26 has a tubular boss or nipple 30 projecting laterally therefrom with its axial bore 31 in communication with the chamber 27 between the slots 28 of the venturi and adapted for screwthreaded engagement by a fuel conductor 32. Flow through the bore 31 from the conductor 32 into the chamber of the body may be controlled by an adjustable bullnosed pin or plug 33, of substantially the same diameter as said bore, screwthreaded in a radial opening 34 in the nipple 30 so as to project transversely into said bore and having a lock nut 35 on its outer end (FIGS. 1-3). The carburetor 10 is particularly adapted for use with internal combustion engines utilizing liquefied petroleum gas which is, necessarily, contained under relatively high pressure and requires pressure regulators and vaporizers and/or combinations thereof to reduce the pressure of and vaporize the fuel supplied to said carburetor. Since the pressure regulators and voporizers are more or less conventional and in common use, the same have not been illustrated. Accordingly, the fuel supplied by the conductor 32 is fully vaporized and is slightly below atmospheric pressure.

As shown most clearly in FIG. 4, the throttle valve 19 includes a shaft 36 extending diametrically through the base or lower portion of the bore 12 and having its end portions journaled in opposed openings 37 formed in thickened wall portions of the body 11 below the enlarged portion 26 of said body. An antifriction, tubular bearing or bearing sleeve 38, which is split for mounting purposes, is confined within each opening 37 upon a reduced end portion 39 of the shaft 36 and each opening has a counterbore 40 at its outer end for receiving an annular washer or sealing ring 41, or felt or other suitable material, in overlying engagement with each bearing. The throttle valve shaft carries an elliptical disk or plate 42 for partially closing the bore 12 and, as shown at 43, at least one end of said shaft projects an appreciable distance externally of the body for connection with an operating linkage (not shown).

A bellcrank 44 has its hub 45 secured to the end portion 43 of the shaft by a diametric pin 46 (FIG. 4) and is provided with a pair of arms 47 and 48 (FIG. 1) extending in opposite directions. The bellcrank 44 has a tubular boss 49 on the outer end of its arm 47 and extending transversely of the shaft 36 for screwthreaded engagement by a stop screw 50. A helical spring 51 is confined on the outer portion of the screw 50 for holding said screw in adjusted positions relative to the arm and its boss 49, the inner end of the screw being arranged to engage a stop pin 52 which projects laterally from the body 11 above the shaft end portion 43 to limit counterclockwise rotation or opening movement of the throttle valve 19 (FIGS. 1 and 2). The bellcrank arm 48 has an opening 53 in its outer end portion for loosely receiving one or the lower of the offset end portions of a push rod 54 which extends longitudinally of the body toward the choke valve 23 and which, as will be explained, is adapted to open said valve when the engine is flooded. If desired, a cylindrical boss 55 may project from the lower portion of the body 11 for tapping and connection with another control (not shown).

As best shown in FIG. 4, the choke valve 23 includes a shaft 56 extending diametrically through the inner or lower portion of the counterbore 22 and having its end portions journaled in opposed openings 57 formed in the body 11. An annular, external boss or collar 58, of relatively large diameter, surrounds each of the openings 57 for receiving a ball bearing assembly 59 and an overlying sealing ring or washer 60 of suitable material. One of the annular bosses 58 is closed by a circular disk or blind plate 61, while an annular disk or plate 62 is confined in the outer end of the other boss and has an end portion 63 of the choke valve shaft projecting externally thereof. An arm or lug 64 has one end fixed on the shaft end portion 63 by a set screw 65 so as to project transversely from said shaft portion for engagement by the upper offset end of the push rod 54, which has its upper portion slidably confined in an apertured ear or lug 66 extending laterally from the upper margin of the enlarged housing portion 26 above the projecting end portion 43 of the throttle valve shaft 36, to rotate the shaft 56 and open the choke valve 23 upon a predetermined opening movement of the throttle valve 19.

The choke valve shaft carries an elliptical disk or plate 67, similar to the throttle valve disk 42, for closing the counterbore 22 and its closing movement is limited by engagement with the tapered inner end of a stop screw 68 which is screwthreaded through an apertured boss 69, formed on the exterior of the wall of the body 11, so as to project into said counterbore in opposed relation to the diaphragm 24 (FIG. 2). A lock nut 70 may be threaded on the outer portion of the screw 68 for holding said screw in the proper position to permit complete closing of the choke valve 23. Opening movement of the choke valve is limited by a pin 71, which projects into the counterbore from the body wall adjacent the annular boss 58 through which the shaft end portion 63 extends, for engagement by the disk 67 of said choke valve. Due to the ball bearing assemblies 59 for rotatably supporting the shaft 56, it is manifest that there be minimum resistance to opening and closing movement of the choke valve 23.

The pressure-responsive member or diaphragm 24 includes a circular case 72 having an inner section or back 73 made integral with the exterior of the outer or upper portion of the body 11 and a complementary outer section or front 74, both of which are dished in the usual manner and have peripheral flanges 75 and 76, respectively, for connection by screws 77 (FIGS. 1 and 2). A circular diaphragm or pressure-responsive element 78 has its margin clamped between the peripheral flanges 75 and 76 and its axial portion overlying a circular opening 79, of relatively small diameter, formed in the wall of the body outwardly or above the choke valve 23 and in diametrically opposed relation to the stop screw 68. The diaphragm element 78 is reinforced by a circular plate 80, of suitable lightweight material, overlying the outer face of said diaphragm element and having its axial portion confined upon the outer portion of a cylindrical plug 81 which projects through said element with its enlarged head 82 disposed within the opening 79. A rod 83 extends axially through the plug 81 and has its intermediate portion secured thereto, the inner portion of the rod projecting into the counterbore 22 and having its end connected to the choke valve disk 67 by an apertured ear or lug 84.

The diaphragm element is urged into sealing engagement with the back 73 of the diaphragm case 72 so as to close the opening 79 by a helical spring 85 which surrounds the outer portion of the rod 83 and has its inner end bearing against a retainer 86 confined upon the plug 81 in overlying relation to the reinforcing plate 80 (FIG. 2). An axial, tubular boss or collar 87 extends outwardly from the front 74 of the diaphragm case to accommodate the outer portions of the rod 83 and spring 85 and has a flanged spring follower 88 screwthreaded in its outer end. In order to vary the compression of the spring and the pressure differential required to flex the diaphragm element 78 outwardly for opening the choke valve 23, the follower 88 is arranged to be secured in adjusted positions by a lock nut 89 screwthreaded on its outer portion. The follower has an axial bore 90 for receiving the outer end of the rod and permitting outward reciprocation of said rod upon outward flexing of the diaphragm element away from the back of the diaphragm case.

A chamber 91 is formed within the diaphragm case 72, by the coaction of its front 74 and the outer face of the element 78, for communicating with the inlet opening 13 of the engine intake manifold 14 and the throat of the venturi 20. The base or lower portions of the front and back of the diaphragm case are provided with enlargements or bosses 92 and 93 which have angular and transverse ports 94 and 95, respectively, formed therein for establishing communication between the chamber 91 and a transverse port 96 in the venturi throat 29 between its slots 28 (FIGS. 2 and 3). An elongate duct or passage 97 extends longitudinally of the wall of the body 11 from the port 95 of the case back boss 93 to the base of said body and, as shown at 98 in FIG. 2, has its lower end closed. The lower portion of the duct 97 communicates with the bore 12 of the body inwardly or below the throttle valve 19 through an upwardly and outwardly inclined port 99 in the wall of said body. For controlling flow through the port 99, an adjusting screw 100 has its tapered inner end extending through the duct into the port 99 and has screwthreaded engagement within an opening 101 alined with said port and extending through a boss 102 formed on the exterior of the body wall. The screw 100 has a helical spring 103 confined on its outer portion for maintaining said screw in adjusted positions.

Since the opening 79 of the body 11 is above or outward of the closed choke valve 23, the axial portion of the inner face of the diaphragm element 78 is exposed constantly to atmospheric pressure which tends to flex said element out of sealing engagement with the back 73 of the diaphragm case 72 so as to expose the entire area of said inner face to atmospheric pressure as well as pull the rod 83 outwardly for opening said choke valve. Of course, this movement of the diaphragm element and rod is prevented by the force of the spring 85 until the pressure in the chamber, at the outer face of said element, becomes sufficiently subatmospheric to permit the atmospheric pressure to overcome said spring force whereby the choke valve is held closed when the engine is not in operation. Due to previous operation of the engine, a combustible mixture of air and gaseous fuel is trapped inwardly or downstream of the closed choke valve 23 and is maintained within the engine manifold 14 so as to be available for instant demand over an appreciable period of time.

Upon starting of the engine, a suction or partial vacuum is applied through the inlet opening 13 of the engine intake manifold to the bore 12 of the body 11 and to the throat 29 of the venturi 20 as well as to the chamber 27 of the enlarged body portion 26 due to the partially opened throttle valve 19 and the slots 28 of said venturi. Simultaneously, a suction or partial vacuum is created in the chamber 91 of the diaphragm 24 through the port 99, duct 97 and ports 94-96 and, usually, is sufficient to permit the atmospheric pressure, exerted upon the diaphragm element 78 through the opening 79, to impart flexing movement to said diaphragm element for opening the choke valve 23 slightly. This suction or partial vacuum is transmitted from the chamber 27 through the bore 31 of the nipple 30 and the conductor 32 so as to draw gaseous fuel from the vaporizer into said chamber and through the slots 28 into the venturi throat 29. Since the outer or upstream end of the venturi is exposed to atmospheric pressure through the slightly opening choke valve and since the port 96 communicates with the throat of said venturi, a combustible mixture of air and gaseous fuel is formed and flows through said port, the duct 97 and port 99 into the bore of the body downstream of the throttle valve so as to enter the intake manifold 14. Of course, a considerable portion of the combustible fuel mixture flows past the partially opened throttle valve 19 to ensure an adequate supply for proper idling of the engine. The volume of flow is controlled by the setting of the throttle valve and the richness of the combustible fuel mixture is regulated by the adjustment of the screw 100.

When the engine is idling, a relatively high suction or vacuum is created downstream of the throttle valve 19 and is transmitted to the chamber 91 so as to flex the diaphragm element 78 and open the choke valve 23 slight further for admitting more air and reducing the richness of the fuel mixture supplied to the engine. Upon opening of the throttle valve, a large volume of air is drawn through the venturi 20 and creates a suction in its throat 29 which further reduces the pressure within the diaphragm chamber below atmospheric pressure whereby the choke valve is opened completely. Conversely, the choke valve 23 moves toward its closed position to reduce the volume of air admitted and the resulting suction when the throttle valve 19 is moved toward its closed position in order to prevent stalling of the engine. As the loading of the engine varies upwardly from idling through idle progression to full loading and then downwardly, or in accordance with different operating conditions, either steadily or irregularly, the choke valve undergoes opening and closing movements to provide accurate control and proper richness of the air and gaseous fuel mixture at all levels. When the engine is stopped, the force of the spring 85 flexes the diaphragm element 78 inwardly to close the choke valve 23 for trapping a combustible mixture downstream thereof within the engine intake manifold.

In the event that the engine becomes flooded with gaseous fuel, such as when the ignition switch is left open during starting, it is necessary to open the choke valve slightly so as to permit said engine to purge itself. This is accomplished by full opening of the throttle valve whereby the push rod 54 is elevated sufficiently to rotate the shaft 56 of the choke valve 23. Under normal conditions, this manner of opening the choke valve is unnecessary since said valve is opened by the flexing of the diaphragm element 78, as explained hereinbefore, and its shaft turns therewith so as to move the arm 64 out of engagement with the push rod. Nevertheless, the opening of the choke valve 23 by the opening of the throttle valve 19 is a highly desirable feature of the carburetor since it permits the purging and starting of a flooded engine.

What I claim and desire to secure by Letters Patent is:

1. A carburetor for internal combustion engines including a body having a bore adapted to communicate with atmosphere and the intake manifold of an internal combustion engine, a throttle valve in the bore of the body adjacent the intake manifold, a venturi in said bore having an outlet directed toward the intake manifold for communicating therewith upon opening of the throttle valve, the venturi having an inlet for communicating with the atmosphere and a throat between its inlet and outlet, the throat of said venturi having a gaseous fuel inlet, valve means in said bore of said body controlling communication of the venturi inlet with the atmosphere, and means for urging the valve means towards its closed position to prevent said venturi from communicating with the atmosphere and including pressure responsive means for controlling the movement of said valve means, the pressure responsive means having one of its surfaces exposed to the atmosphere and its opposite surface exposed to the intake manifold and to said bore of said body between said throttle valve and valve means.

2. A carburetor as set forth in claim 1 including means movable with the throttle valve for engaging and opening the valve means upon a predetermined opening of said throttle valve.

3. A carburetor as set forth in claim 1 wherein the surface of the pressure responsive means which is exposed to the bore of the body communicates with the interior of the venturi.

4. A carburetor as set forth in claim 1 wherein the body has an air inlet communicating with its bore in spaced relation to the valve means as well as to the urging and pressure-responsive means.

5, A carburetor as set forth in claim 1 wherein the pressure responsive means includes a diaphragm, the body having a lateral opening establishing communication between its bore and one of the surfaces of the diaphragm to exposed said diaphragm surface to atmosphere.

6. A carburetor as set forth in claim 5 wherein the diaphragm has connection with the valve means and the urging means includes means for engaging said diaphragm to bias said valve means toward its closed position.

7. A carburetor as set forth in claim 5 including means movable with the throttle valve for engaging and opening the valve means upon a predetermined opening of said throttle valve.

8. A carburetor as set forth in claim 1 wherein the pressure responsive means has connection with the valve means and the urging means includes means for engaging said pressure means to bias said valve means toward its closed position.

9. A carburetor as set forth in claim 1 wherein the throttle valve and valve means each includes rotatable shaft means projecting externally of the body, and means extending between the externally projecting shaft means and movable with the throttle valve shaft means for imparting rotation to the shaft means for the valve means to open said valve means upon a predetermined rotation of said throttle valve shaft means.

References Cited

UNITED STATES PATENTS

| | | | |
|---|---|---|---|
| 2,101,605 | 12/1937 | Winfield | 261—52 XR |
| 2,182,090 | 12/1939 | Mallory | 261—52 |
| 2,917,294 | 12/1959 | Holley | 261—52 XR |

MORRIS O. WOLK, Primary Examiner

M. D. BURNS, Assistant Examiner

U.S. Cl. X.R.

261—50.1